UNITED STATES PATENT OFFICE.

HARRY McCORMACK, OF CHICAGO, ILLINOIS.

MANUFACTURE OF RESORCINOL.

1,406,745.  Specification of Letters Patent.  Patented Feb. 14, 1922.

No Drawing.  Application filed February 9, 1920. Serial No. 357,249.

*To all whom it may concern:*

Be it known that I, HARRY McCORMACK, a citizen of the United States, residing at Chicago, in the county of Cook and State of Illinois, have invented certain new and useful Improvements in the Manufacture of Resorcinol; and I do hereby declare the following to be a full, clear, and exact description of the invention, such as will enable others skilled in the art to which it appertains to make and use the same.

This invention relates to manufacture of resorcinol; and it relates more particularly to a process of preparing resorcinol from benzene disulfonic acid, wherein benzene disulfonic acid, usually in the form of a salt thereof, is reacted upon with caustic alkali, specifically sodium hydroxid or caustic soda, to form the corresponding alkali metal resorcinate, which latter is then treated with the proper amount of mineral acid to set free resorcinol in admixture with an alkali metal salt or salts, such as sodium sulfate and sodium sulfite, said salts being separated in large measure from the resorcinol in the mixture by systematic crystallization, and the separation of the resorcinol from the residual salts still remaining admixed therewith after crystallization being then effected either with the aid of a selective solvent for resorcinol, employed in much smaller quantity than has been indispensable heretofore, or by another procedure by which the use of the selective solvent may be dispensed with altogether.

In the commercial manufacture of resorcinol as heretofore practiced, benzene disulfonic acid, or more commonly the sodium salt thereof prepared in a well known manner, is heated with an excess of caustic soda (sodium hydroxid), the resultant reaction mixture containing sodium resorcinate, sodium sulfite and some unchanged sodium hydroxid. The mixture is then dissolved in a large amount of hot water, and the solution is treated with the requisite amount of a mineral acid, sulfuric acid being commonly employed, or sometimes hydrochloric acid. After the addition of acid, the solution is boiled to drive off sulfurous acid, and after cooling, the solution is filtered to remove tarry matter, and the filtrate is extracted with ether or with some other solvent which is immiscible with water and which is a selective solvent for resorcinol. The etheric solution of resorcinol is then evaporated, yielding crude resorcinol which may be further purified in various ways.

The known commercial method above described for the manufacture of resorcinol requires the use of a very large quantity of immiscible solvent in order to secure a reasonably complete extraction of resorcinol from the water solution. This is because resorcinol is more soluble in water than in said solvent. The necessity for employing such large quantities of solvent increases the technical difficulties of manufacture, and it is a substantial factor in the cost of the final product.

It is a principal object of the present invention to so alter the customary practice heretofore prevailing as to greatly reduce the amount of selective solvent required for separation of resorcinol from the salts necessarily occurring in admixture therewith at certain stages of its manufacture from benzene disulfonic acid; or optionally to eliminate the use of such selective solvent altogether. A further and general object is to simplify and cheapen the manufacture of resorcinol by certain novel steps to be explained hereinafter.

In general, the objects of the invention are attained by working with aqueous solutions of resorcinol-containing mixtures of such concentration, that crystallization of the alkali metal salt or salts present may be made to occur as the solutions cool from an initial heated condition. Resorcinol being much more soluble in water than are the alkali salts involved, specifically sodium sulfite and sodium sulfate, it is possible to crystallize large and even major proportions of the salts without accompanying perceptible crystallization of resorcinol. The crystallized salt or salts having been removed from the cooled solution in any suitable manner, the residual concentrated solution of resorcinol still containing a comparatively small amount of admixed salt or salts, may then be evaporated to substantial dryness at a low temperature, under diminished pressure if desired. From the dry residue of mixed resorcinol and salts, resorcinol may be dissolved out by means of a selective solvent for resorcinol, such as benzol, ether, ethyl alcohol, amyl alcohol, or any other solvent which will dissolve resorcinol and which will not dissolve the admixed salt or salts to any substantial extent. It will be noted that by proceeding in this manner, the number of selective solvents possible to employ is comparatively large, since it is not necessary that the solvent be immiscible with water as was the case in customary practice prevailing heretofore. Moreover, only a comparatively small amount of the solvent is necessary to effect substantially complete extraction of the resorcinol from the dry mass treated.

In an alternative procedure, the dry mixture of resorcinol and alkali metal salt or salts can be heated in vacuo to distil off resorcinol, this procedure avoiding the use of any selective solvent.

In order to afford a full understanding of the underlying principles of the invention, a description of an especially desirable typical embodiment of the complete process, including the preparation of benzene disulfonic acid, will now be given.

Benzene monosulfonic acid is first prepared by the sulfonation of benzol with fuming sulfuric acid which may be made up to a strength of 20 per cent $SO_3$. The sulfonation is carried out by heating the sulfonation kettle with steam and maintaining the temperature of the reaction mixture at around 70° C. until the sulfonation to monosulfonic acid is complete. This mixture is then transferred to a jacketed oil-heated pan, the temperature of sulfonation being raised gradually to about 225° C. or somewhat higher, at which point the sulfonation to benzene disulfonic acid is complete. The excess sulfuric acid is then neutralized with lime, calcium sulfate is filtered off, and the calcium benzene disulfonate is changed to sodium benzene disulfonate by the addition of sodium carbonate; after which, the precipitated calcium carbonate is filtered out and the solution of sodium benzene disulfonate is evaporated to crystallization. Solid sodium hydroxid is melted in a cast iron pan provided with a stirrer and to the molten sodium hydroxid is gradually added the proper quantity of sodium benzene disulfonate. While the proportions may be varied in practice, it has been found desirable to use the reagents in the proportion of 250 kilograms of sodium hydroxid to 125 kilograms of dry sodium benzene disulfonate. The mixture is heated at a temperature of 315° C. for approximately two hours, at the end of which time the reaction is complete. In the resultant melt are present sodium resorcinate, sodium sulfite, and some unchanged sodium hydroxid.

In practicing the process of the present invention, the melt obtained as above described is dissolved in hot water to obtain a concentrated solution from which sodium sulfite will crystallize as the solution cools. In practice, using the weights of sodium hydroxid and sodium benzene disulfonate given in the above specific example, the addition of 600 liters of boiling hot water to the reaction melt has given satisfactory results, although it is not intended to limit the practice of the invention to the use of this particular proportion of water. The solution thus obtained is cooled either artificially or by allowing it to cool spontaneously, until the major portion of the contained sodium sulfite has crystallized out. The solution may be separated from the crystals in any suitable manner as by decantation, centrifuging, or other means; and the separated solution consisting mainly of sodium resorcinate and sodium hydroxid is neutralized by adding cautiously the requisite amount of sulfuric acid preferably at about 60° Baumé. This results in formation of sodium sulfate and resorcinol. The solution which is hot when the neutralizing action is completed, is then cooled until the major portion of the sodium sulfate crystallizes out, the crystals being removed by decantation, filtration, or centrifuging. The residual solution, which contains a mixture of resorcinol with the comparatively small amount of sodium sulfate that did not crystallize out, and usually containing also some sodium sulfite, is evaporated at low temperature to substantial dryness, employing diminished pressure if desired. The resultant dry powder, consisting chiefly of resorcinol mixed with sodium sulfate, may then be treated for separation of resorcinol in either of two ways, in accordance with the invention. Said dry powder may be extracted with a suitable solvent, such as any of those above mentioned or mixtures of two or more of such solvents, in which the resorcinol is soluble and sodium sulfate and sodium sulfite are substantially insoluble; the solution of resorcinol resulting from the extraction being then evaporated to recover resorcinol, and the solvent also being recovered for re-use. The resorcinol thus obtained may be further purified in known manner by distillation in vacuo. Or, where it is desired to dispense with the use of a solvent altogether, the aforesaid dry powder may be heated in vacuo, resorcinol distilling off, and the admixed sodium sulfate and sodium sulfite (if any) being left as a residue in the still.

The expression benzene disulfonic acid occuring in the claims is to be understood as generic and as denoting said acid broadly whether in free condition or in the form of a salt thereof.

While I have described a specific embodiment of the invention for the purpose of clearly explaining the underlying principles thereof, it is to be understood that the invention is not limited to the specific details of procedure disclosed, and the appended claims are to be interpreted accordingly.

What I claim is:

1. In the manufacture of resorcinol, the process which comprises treating with hot water the melt resulting from caustic soda fusion of benzene disulfonic acid to obtain a concentrated solution, allowing the solution to cool, separating crystallized sodium sulfite therefrom, neutralizing the residual solution with sulfuric acid, allowing the resultant hot solution to cool, separating crystallized sodium sulfate therefrom, evaporating the residual solution substantially to dryness, and separating resorcinol from the residue by extraction with a selective solvent for resorcinol.

2. In the manufacture of resorcinol, the process which comprises treating with an aqueous mineral acid the product obtained by reaction between benzene disulfonic acid and a caustic alkali, to obtain an aqueous solution containing resorcinol and a salt of said mineral acid, separating a substantial proportion of said salt from the solution by crystallization, evaporating the remaining solution substantially to dryness, and separating resorcinol from the residue.

3. In the manufacture of resorcinol, the process which comprises treating with an aqueous mineral acid the product obtained by reaction between benzene disulfonic acid and a caustic alkali, to obtain an aqueous solution containing resorcinol and a salt of said mineral acid, separating a substantial proportion of said salt from the solution by crystallization, evaporating the remaining solution substantially to dryness, extracting the residue with a selective solvent for resorcinol, and recovering resorcinol from the solution thus obtained.

4. In the manufacture of resorcinol from benzene disulfonic acid, the hereindescribed steps which comprise cooling a hot concentrated aqueous solution containing resorcinol and an alkali metal mineral acid salt of lower water solubility than resorcinol until a large part of said salt has crystallized out, separating and evaporating the remaining solution substantially to dryness, and separating resorcinol from the residue by extraction with a selective solvent for resorcinol.

5. In the manufacture of resorcinol from benzene disulfonic acid, the hereindescribed steps which comprise preparing a hot concentrated aqueous solution from the melt obtained by heating benzene disulfonic acid with caustic soda, and separating sodium sulfite from said solution by crystallization.

6. In the manufacture of resorcinol, the hereindescribed step of extracting a substantially dry mixture comprising resorcinol and an alkali metal salt with a selective solvent for resorcinol.

7. In the manufacture of resorcinol, the hereindescribed step of extracting a substantially dry mixture comprising resorcinol, sodium sulfate and sodium sulfite, with a selective solvent for resorcinol.

8. In the manufacture of resorcinol, the process of obtaining resorcinol from an aqueous solution containing also an alkali metal salt of a mineral acid, which comprises separating alkali metal salt from such solution by crystallization, evaporating the remaining solution, and extracting the evaporation residue with a selective solvent for resorcinol.

9. In the manufacture of resorcinol, the process of obtaining resorcinol from an aqueous solution containing an alkali metal resorcinate, a caustic alkali, and an alkali metal sulfite, which comprises separating alkali metal sulfite by crystallization, neutralizing the remaining solution with sulfuric acid, separating alkali metal sulfate by crystallization, and recovering resorcinol from the residual solution.

10. In the manufacture of resorcinol, the process of obtaining resorcinol from an aqueous solution obtained by dissolving in water the melt resulting from fusion of an alkali metal salt of benzene disulfonic acid with an excess of caustic alkali, which comprises separating alkali metal sulfite by crystallization, neutralizing the remaining solution with sulfuric acid, separating alkali metal sulfate by crystallization, evaporating the remaining solution, and extracting the evaporation residue with a selective solvent for resorcinol.

In testimony whereof I hereunto affix my signature.

HARRY McCORMACK.